United States Patent
Lee et al.

(10) Patent No.: US 9,759,853 B2
(45) Date of Patent: Sep. 12, 2017

(54) BACKLIGHT UNIT AND DISPLAY APPARATUS HAVING THE SAME

(71) Applicant: Samsung Display Co., Ltd., Yongin, Gyeonggi-Do (KR)

(72) Inventors: Hayoung Lee, Seoul (KR); Daehoon Song, Seoul (KR); Sung-Kyu Shim, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/819,063

(22) Filed: Aug. 5, 2015

(65) Prior Publication Data

US 2016/0103264 A1 Apr. 14, 2016

(30) Foreign Application Priority Data

Oct. 14, 2014 (KR) .................. 10-2014-0138446

(51) Int. Cl.
*F21V 8/00* (2006.01)

(52) U.S. Cl.
CPC ......... *G02B 6/0038* (2013.01); *G02B 6/0018* (2013.01); *G02B 6/0068* (2013.01)

(58) Field of Classification Search
CPC .. G02B 6/0021; G02B 6/0091; G02B 6/0066; G02B 6/0013; G02B 6/0015
See application file for complete search history.

(56) References Cited

U.S. PATENT DOCUMENTS

2012/0026430 A1* 2/2012 Chen .................. G02B 6/0016
349/65

FOREIGN PATENT DOCUMENTS

| KR | 10-2008-0051941 | 6/2008 |
| KR | 10-0868922 | 11/2008 |
| KR | 10-1066755 | 9/2011 |
| KR | 10-2013-0005238 | 1/2013 |
| KR | 10-1240253 | 3/2013 |
| KR | 10-2013-0037111 | 4/2013 |
| KR | 10-2014-0018742 | 2/2014 |

* cited by examiner

*Primary Examiner* — Michael Caley
*Assistant Examiner* — Mariam Qureshi
(74) *Attorney, Agent, or Firm* — Innovation Counsel LLP

(57) ABSTRACT

A light guide plate receives light and guides the light to a display panel. The light guide plate includes a body and protruding portions. The body includes a first side surface disposed adjacent to the light source, a second side surface facing the first side surface, and an upper surface. Protruding portions are protruded from the upper surface. Each of the protruding portions includes first and second protruding portions sequentially arranged from the first side surface to the second side surface. A width of the first protruding portion in a direction substantially parallel to the first side surface becomes smaller as a distance from the first side surface becomes larger, and a width of the second protruding portion in the direction substantially parallel to the first side surface becomes larger as the distance from the first side surface becomes larger.

20 Claims, 8 Drawing Sheets

BACKLIGHT UNIT AND DISPLAY APPARATUS HAVING THE SAME

CROSS-REFERENCE TO RELATED APPLICATION

This U.S. non-provisional patent application claims priority under 35 U.S.C. §119 to Korean Patent Application No. 10-2014-0138446, filed on Oct. 14, 2014, the contents of which are hereby incorporated by reference in its entirety.

BACKGROUND

1. Field of Disclosure

The present disclosure relates to a backlight unit and a display apparatus having the same. More particularly, the present disclosure relates to a backlight unit providing a light having uniform brightness and a display apparatus having the backlight unit.

2. Description of the Related Art

A non-self-emissive display apparatus, such as a liquid crystal display apparatus, an electrophoretic display apparatus, an electrowetting display apparatus, etc., requires a backlight unit to supply light thereto. The backlight unit is classified into an edge-illumination type backlight unit and a direct-illumination type backlight unit according to a position of a light source such as a light emitting diode with respect to a display surface on which an image is displayed.

The edge-illumination type backlight unit has a thickness thinner than that of the direct-illumination type backlight unit. Accordingly, mobile displays mainly adopt the edge-illumination type backlight unit as their light source.

SUMMARY

The present disclosure provides a backlight unit providing a light having uniform brightness.

The present disclosure provides a display apparatus having improved display quality.

Embodiments of the inventive concept provide a display apparatus including a display panel, a light source, and a light guide plate. The display panel receives a light and displays an image. The light source emits the light. The light guide plate receives the light and guides the light to the display panel.

The light guide plate includes a body and protruding portions. The body includes a first side surface disposed adjacent to the light source, a second side surface facing the first side surface, and an upper surface. Protruding portions are protruded from the upper surface. Each of the protruding portions includes first and second protruding portions sequentially arranged from the first side surface to the second side surface. A width of the first protruding portion in a direction substantially parallel to the first side surface becomes smaller as a distance from the first side surface becomes larger, and a width of the second protruding portion in the direction substantially parallel to the first side surface becomes larger as the distance from the first side surface becomes larger.

Embodiments of the inventive concept provide a backlight unit including a light source emitting the light and a light guide plate receiving the light and guiding the light.

The light guide plate includes a body and protruding portions. The body includes a first side surface disposed adjacent to the light source, a second side surface facing the first side surface, and an upper surface. Protruding portions are protruded from the upper surface. Each of the protruding portions includes first and second protruding portions sequentially arranged from the first side surface to the second side surface. A width of the first protruding portion in a direction substantially parallel to the first side surface becomes smaller as a distance from the first side surface becomes larger, and a width of the second protruding portion in the direction substantially parallel to the first side surface becomes larger as the distance from the first side surface becomes larger.

According to the above, the protruding portion and the horizontal surface are alternately arranged with each other in an area of the light exit surface of the light guide plate, which is adjacent to the light incident surface. Therefore, the light emitted from the light source exits through the protruding portion or the horizontal surface, and thus the hot spot may be prevented from occurring on the light exit surface. As a result, the backlight unit provides the light with uniform brightness to the display panel and the display quality of the display apparatus is improved.

In addition, the height of the light incident surface corresponds to a sum of the height of the first side surface of the body of the light guide plate and the height of one surface of the first protruding portion. Therefore, the area of the light incident surface of the light guide plate, to which the light is incident, becomes wide. Thus, the light incident efficiency of the light guide plate is improved and the light utilization efficiency of the backlight unit is improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
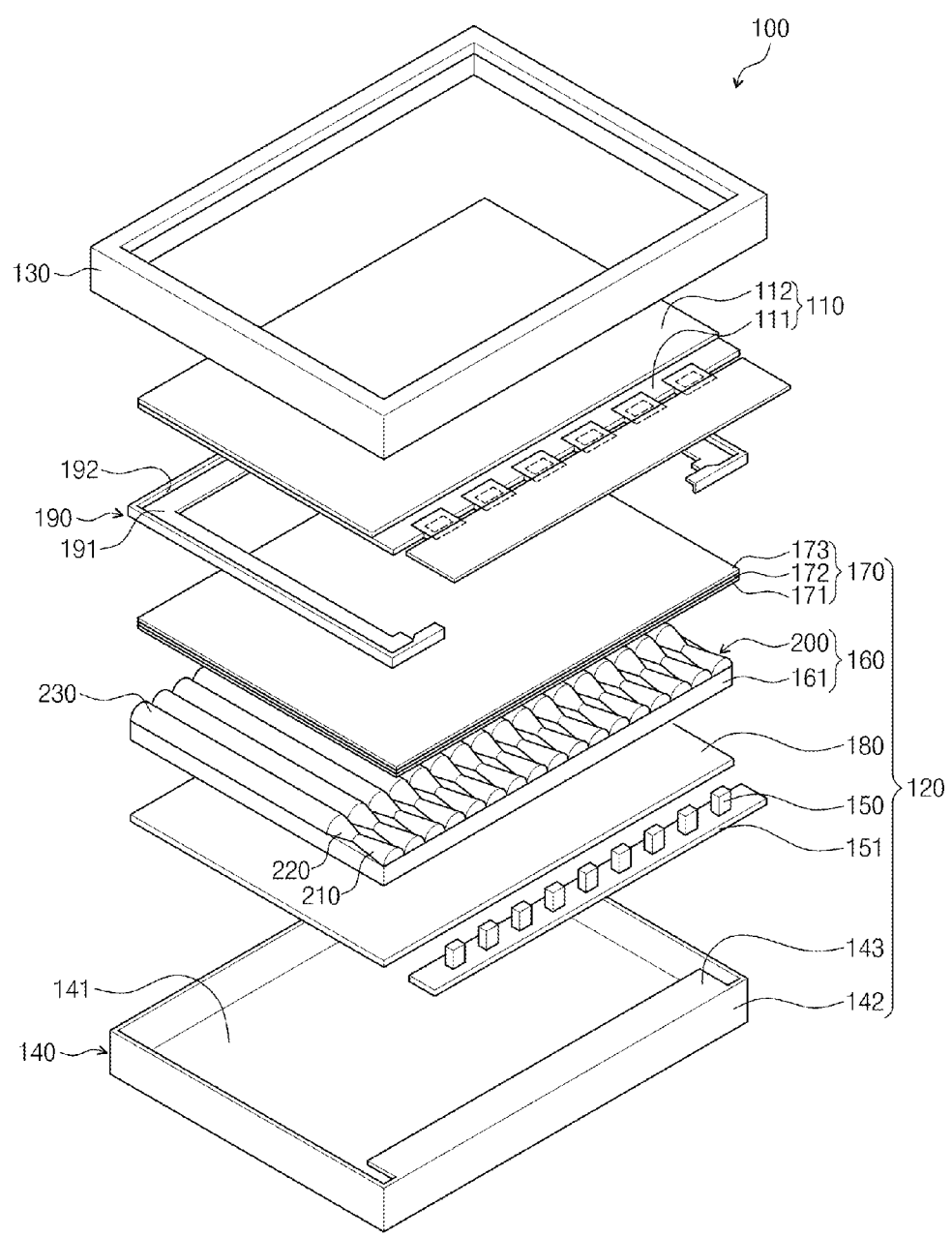
FIG. 1 is an exploded perspective view showing a display apparatus according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present between the element or layer and the another element or layer. In contrast, when an element is referred to as being "directly on," "directly connected to" or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to limit the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present inventive concept will be explained in detail with reference to the accompanying drawings.

FIG. 1 is an exploded perspective view showing a display apparatus 100 according to an exemplary embodiment of the present disclosure.

Referring to FIG. 1, the display apparatus 100 includes a display panel 110, a backlight unit 120, and a top chassis 130.

The display panel 110 displays an image. The display panel 110 may be a liquid crystal display panel, an electrowetting display panel, an electrophoretic display panel, or a microelectromechanical system display panel. In the present exemplary embodiment, the liquid crystal display panel will be described as the display panel 110.

The display panel 110 has a quadrangular plate shape with two pairs of sides. In the present exemplary embodiment, the display panel 110 may have a rectangular shape of a pair of long sides and a pair of short sides. The display panel 110 includes a display substrate 111, an opposite substrate 112 facing the display panel 111, and a liquid crystal layer (not shown) interposed between the display substrate 111 and the opposite substrate 112. The display panel 110 includes a display area in which an image is displayed and a non-display area surrounding the display area, in which the image is not displayed.

The backlight unit 120 is disposed under the display panel 110 to supply the light to the display panel 110. The backlight unit 120 includes an accommodating part 140, a light source 150, a light guide plate 160, optical sheets 170, a reflective sheet 180, and a mold frame 190.

The accommodating part 140 includes a bottom portion 141, a sidewall 142 extending from the bottom portion 141, and a cover part 143 extending from a top of the sidewall 142 to be substantially parallel to the bottom portion 141. The cover part 143 covers the light source 150 and the sidewall 142 extends upward from the bottom portion 141.

The accommodating part 140 accommodates the light source 150 and the light guide plate 160 therein and the light source 150 and the light guide plate 160 are placed on the bottom portion 141.

The light source 150 supplies light to at least one side surface of the light guide plate 160. A printed circuit board 151 is disposed between the light source 150 and the bottom portion 141. The light source 150 is mounted on the printed circuit board 151 and applied with a driving voltage from the printed circuit board 151.

The light guide plate 160 receives the light from the light source 150 and guides the light to the display panel 110. The light guide plate 160 includes a body 161 and protruding portions 200. In the present exemplary embodiment, each of the protruding portions 200 includes a first protruding portion 210, a second protruding portion 220, and a third protruding portion 230.

The body 161 has a substantially plate shape. The protruding portions 200 are disposed on an upper surface of the body 161. The body 161 and the protruding portions 200 include the same material. For instance, the body 161 and the protruding portions 200 include at least one of polyamide (PA), polymethyl methacrylate (PMMA), methyl methacrylate-styrene (MS), and polycarbonate (PC).

The body 161 and the protruding portions 200 of the light guide plate 160 are formed by using a single injection molding process, but they should not be limited thereto or thereby. According to another embodiment, the light guide plate 160 is manufactured by forming a plate using an extrusion or injection process and performing an etching process on the plate using a laser, to form the protruding portions 200 on the plate.

The optical sheets 170 are disposed between the light guide plate 160 and the display panel 110. The optical sheets 170 control a path of the light guided by the light guide plate 160. The optical sheets 170 are configured to include a diffusion sheet 171, a prism sheet 172, and a protective sheet 173.

The diffusion sheet 171 diffuses the light and the prism sheet 172 collects the diffused light such that a direction in which the diffused light travels substantially coincides with a normal line direction of the display panel 110. The protection sheet 173 protects the prism sheet 172 from external impacts. In the present exemplary embodiment, the optical sheets 170 include one diffusion sheet 171, one prism sheet 172, and one protection sheet 173, but they should not be limited thereto or thereby. That is, at least one of the diffusion sheet 171, the prism sheet 172, and the protection sheet 173 of the optical sheets 170 may be provided in a plural number, and one or more sheets of the optical sheets 170 may be omitted if necessary.

The reflection sheet 180 is disposed between the light guide plate 160 and the bottom portion 141. The reflection sheet 180 reflects the light incident upon the reflection sheet 180 which is leaked from the light guide plate 160 towards the light guide plate 160.

The mold frame 190 is disposed between the display panel 110 and the backlight unit 120. The mold frame 190 includes a supporting part 191 and a frame sidewall 192 extending upward from the supporting part 191. The display panel 110 is disposed on the supporting part 191 of the mold frame 190. In the present exemplary embodiment, the mold frame 190 is provided as a member to support the display panel 110, but it should not be limited thereto or thereby. For instance, according to another embodiment, the mold frame 190 may be omitted. In this case, the display panel 110 is supported by the accommodating part 140, and the accommodating part 140 and the display panel 110 are fixed to each other by an adhesive member (not shown).

The top chassis 130 is disposed on the display panel 110 to cover the non-display area of the display panel 110. The top chassis 130 is coupled to the accommodating part 140 to support an edge of the display panel 110, and a display window is formed through the top chassis 130 to expose the display area of the display panel 110.

Figure 2:
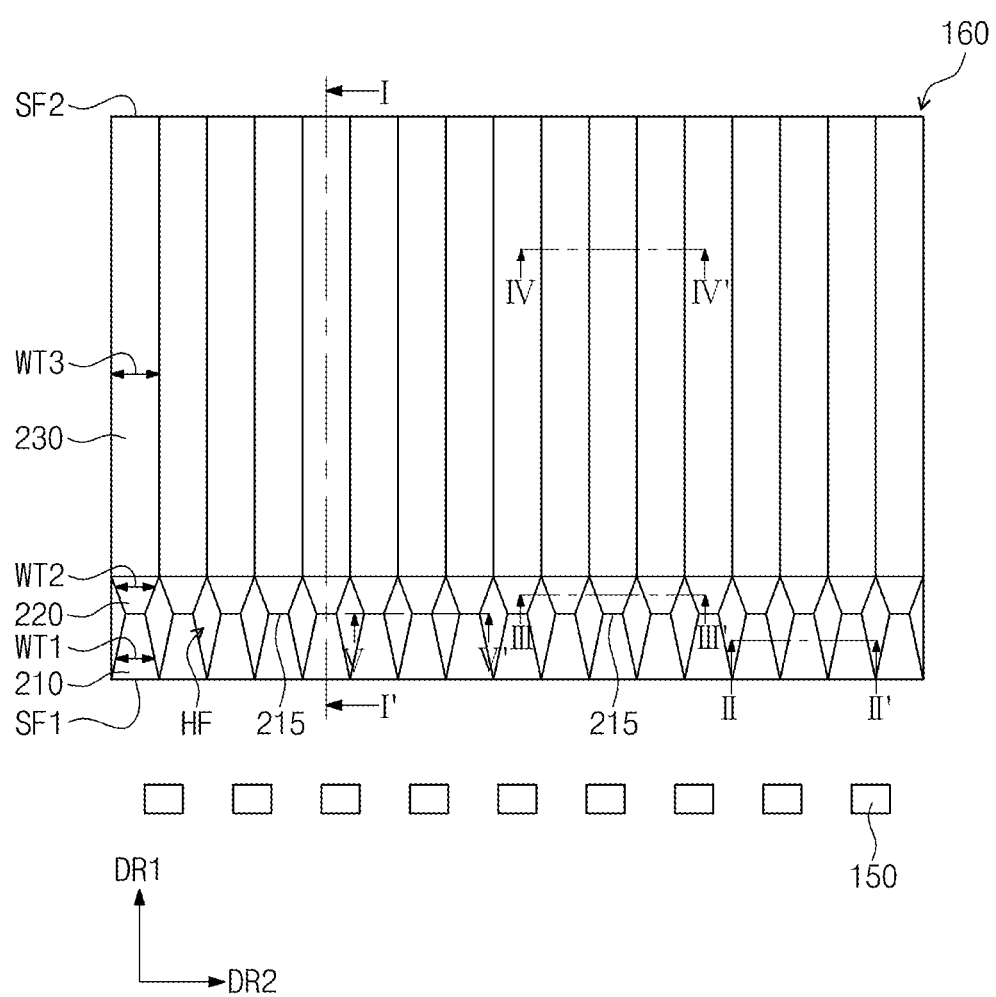
FIG. 2 is a plan view showing a light guide plate and a light source shown in FIG. 1.
Figure 3:
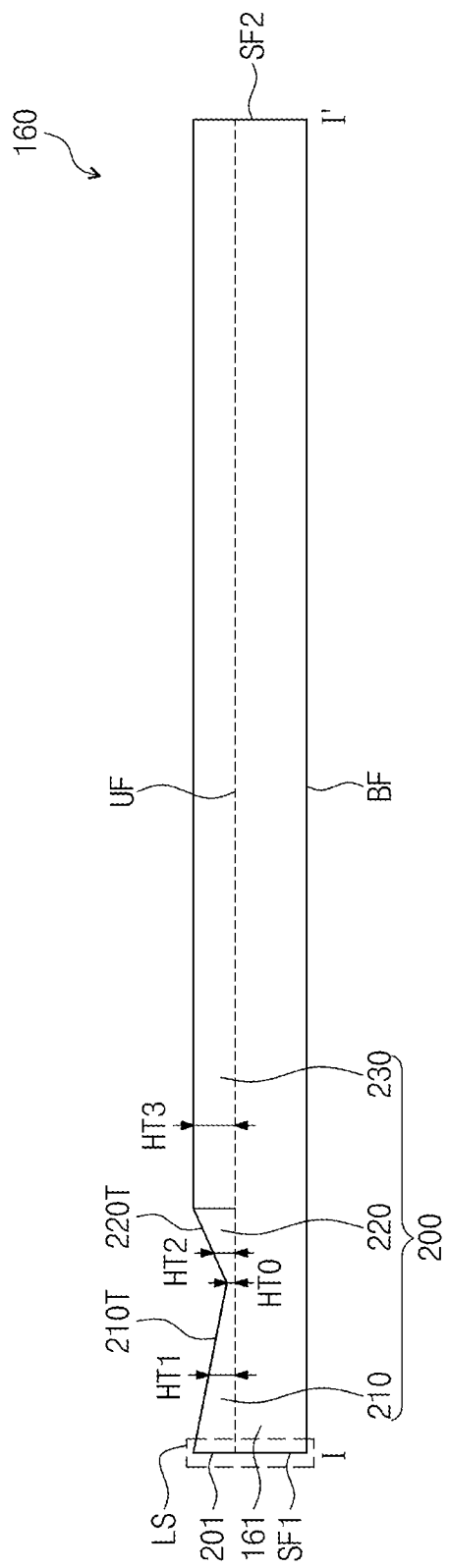
FIG. 3 is a cross-sectional view taken along a line I-I' shown in FIG. 2.

FIG. 2 is a plan view showing a light guide plate and a light source shown in FIG. 1 and FIG. 3 is a cross-sectional view taken along a line I-I' shown in FIG. 2. In FIGS. 2 and 3, the same reference numerals denote the same elements in FIG. 1, and thus detailed descriptions of the same elements will be omitted.

Referring to FIGS. 2 and 3, the body 161 of the light guide plate 160 includes a first side surface SF1, a second side surface SF2, an upper surface UF, and a bottom surface BF.

The second side surface SF2 faces the first side surface SF1, the upper surface UF connects top portions of the first side surface SF1 and the second side surface SF2 to face the display panel 110 (refer to FIG. 1), and the bottom surface BF connects bottom portions of the first side surface SF1 and the second side surface SF2 to face the upper surface UF.

Each of the protruding portions 200 extends in a first direction DR1 toward the second side surface SF2 from the first side surface SF1 and the protruding portions 200 are arranged in a second direction DR2 substantially parallel to a direction in which the first side surface SF1 extends. In the present exemplary embodiment, the first and second directions DR1 and DR2 are substantially perpendicular to each other.

Each of the protruding portions 200 includes the first, second, and third protruding portions 210, 220, and 230. The first, second, and third protruding portions 210, 220, and 230 are sequentially arranged in the first direction DR1. The second protruding portion 220 is disposed between the first and third protruding portions 210 and 230 to connect the first and third protruding portions 210 and 230.

In the present exemplary embodiment, a first width WT1 in the second direction DR2 of the first protruding portion 210 becomes smaller as a distance from the first side surface SF1 becomes larger. A second width WT2 in the second direction DR2 of the second protruding portion 220 becomes larger as the distance from the first side surface SF1 becomes larger, and a width WT3 in the second direction DR2 of the third protruding portion 230 is constant.

Each of the first and second widths WT1 and WT2 is variable and each of the first and second widths WT1 and WT2 is equal to or smaller than the third width WT3. Accordingly, a portion of the upper surface UF disposed under the first and second protruding portions 210 and 220 is exposed. Hereinafter, the exposed portion of the upper surface UF is referred to as a horizontal surface HF.

In the present exemplary embodiment, the first protruding portion 210 has a first height HT1 decreasing as the distance from the first side surface SF1 increases, the second protruding portion 220 has a second height HT2 increasing as the distance from the first side surface SF1 increases, and the third protruding portion 230 has a third height HT3 that is substantially constant.

A minimum value of the first width WT1 is substantially equal to a minimum value of the second width WT2 and a minimum value of the first height HT1 is substantially equal to a minimum value of the second height HT2. Therefore, a variation in height and width of the portion in which the first protruding portion 210 is coupled with the second protruding portion 220 may be continuous. In addition, a maximum value of the second width WT2 is substantially equal to the third width WT3 and a maximum value of the second height HT2 is substantially equal to the third height HT3. Therefore, a variation in height and width of the portion in which the second protruding portion 220 is coupled with the third protruding portion 230 may be continuous.

The light source 150 is disposed adjacent to the first side surface SF1. A light incident surface LS, to which the light emitted from the light source 150 is incident, is defined by the first side surface SF1 and one surface 201 of the first protruding portion 210.

According to the present exemplary embodiment, an area of the light incident surface LS is increased by an area of the surface 201 when compared with the area of the light incident surface LS defined by only the first side surface SF1. Thus, a light incident efficiency of the light guide plate 160 is improved, so that a light utilization efficiency of the light emitted from the light source 150 is improved.

The first protruding portion 210 has a length one and a half times greater than a length of the second protruding portion 220. As a result, a slope of an inclined surface 210T of the first protruding portion 210 is smaller than a slope of an inclined surface 220T of the second protruding portion 220. Accordingly, since the slope of the inclined surface 210T of the first protruding portion 210 is relatively small, the light is easily totally reflected by the inclined surface 210T of the first protruding portion 210. Therefore, the light leaked from the light guide plate 160 through the inclined surface 210T of the first protruding portion 210 may be reduced.

According to another embodiment, a reflective pattern (not shown) may be further disposed on the bottom surface BF to reflect the light to the display panel 110. The reflective pattern (not shown) is formed by processing the bottom surface BF to have a convex shape or a concave shape. As another way, the reflective pattern (not shown) is formed by printing a material, which reflects the light, on the bottom surface BF.

Figure 4A:
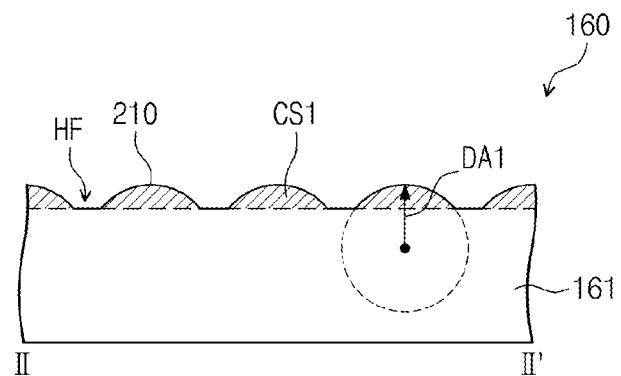
FIG. 4A is a cross-sectional view taken along a line II-II' shown in FIG. 2.
Figure 4B:
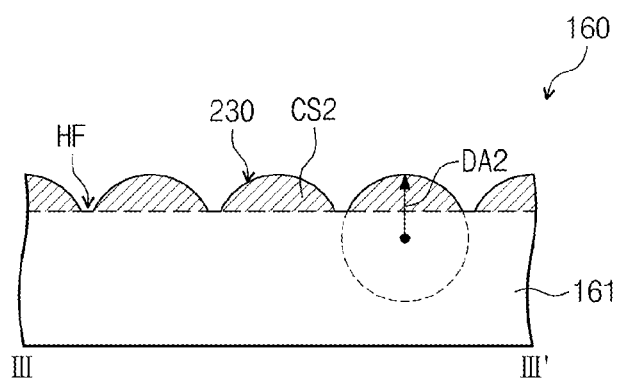
FIG. 4B is a cross-sectional view taken along a line III-III' shown in FIG. 2.
Figure 4C:
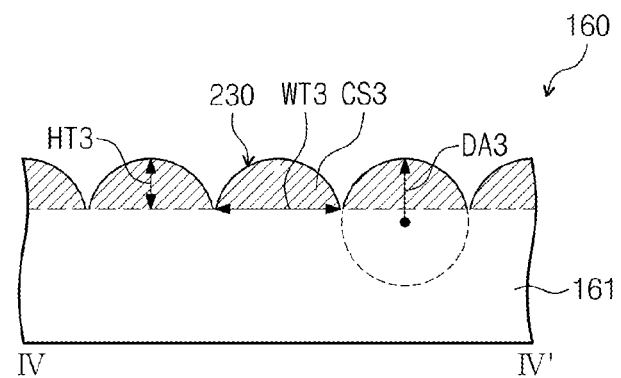
FIG. 4C is a cross-sectional view taken along a line IV-IV' shown in FIG. 2.

FIG. 4A is a cross-sectional view taken along a line II-II' shown in FIG. 2, FIG. 4B is a cross-sectional view taken along a line III-III' shown in FIG. 2, and FIG. 4C is a cross-sectional view taken along a line IV-IV' shown in FIG. 2. In FIGS. 4A, 4B, and 4C, the same reference numerals denote the same elements in FIGS. 2 and 3, and thus detailed descriptions of the same elements will be omitted.

As shown in FIGS. 4A to 4C, an outer portion of each of a first cross-sectional surface CS1 of the first protruding portion 210, a second cross-sectional surface CS2 of the second protruding portion 220, and a third cross-sectional surface CS3 of the third protruding portion 230 has a round shape. The first, second, and third protruding portions 210, 220, and 230 collect the light, which is incident to the body 161 through the light incident surface LS (refer to FIG. 3) of the light guide plate 160 and inclined with respect to the body 161, to allow the light to travel in a direction substantially vertical to the display panel 110 (refer to FIG. 1).

In the present exemplary embodiment, a first radius of curvature DA1 of the first protruding portion 210, a second radius of curvature DA2 of the second protruding portion 220, and a third radius of curvature DA3 of the third protruding portion 230 may be equal to each other. A degree of the lights, which are collected to the display panel 110 (refer to FIG. 1) after respectively passing through the first, second, and third protruding portions 210, 220, and 230, becomes different according to the first, second, and third radius curvatures DA1, DA2, and DA3. For instance, as the first, second, and third radius curvatures DA1, DA2, and DA3 become smaller, the lights exiting from the protruding portions 200 tend to travel in the direction substantially vertical to the display panel 110 (refer to FIG. 1), and thus the lights are collected to the display panel 110 and the light utilization efficiency is improved. However, as the first, second, and third radius curvatures DA1, DA2, and DA3 become smaller, an amount of the light leaked from the area of the light guide plate 160, in which the lights are incident, increases. Therefore, the radius curvatures of the protruding portions need to be determined in consideration of the size of the display apparatus 100 (refer to FIG. 1) and the material of the light guide plate 160.

The outer portion of each of the first, second, and third protruding portions 210, 220, and 230 should not be limited to the round shape. For instance, according to another embodiment, the outer portion of each of the first, second, and third protruding portions 210, 220, and 230 may have a prism shape.

Figure 5A:
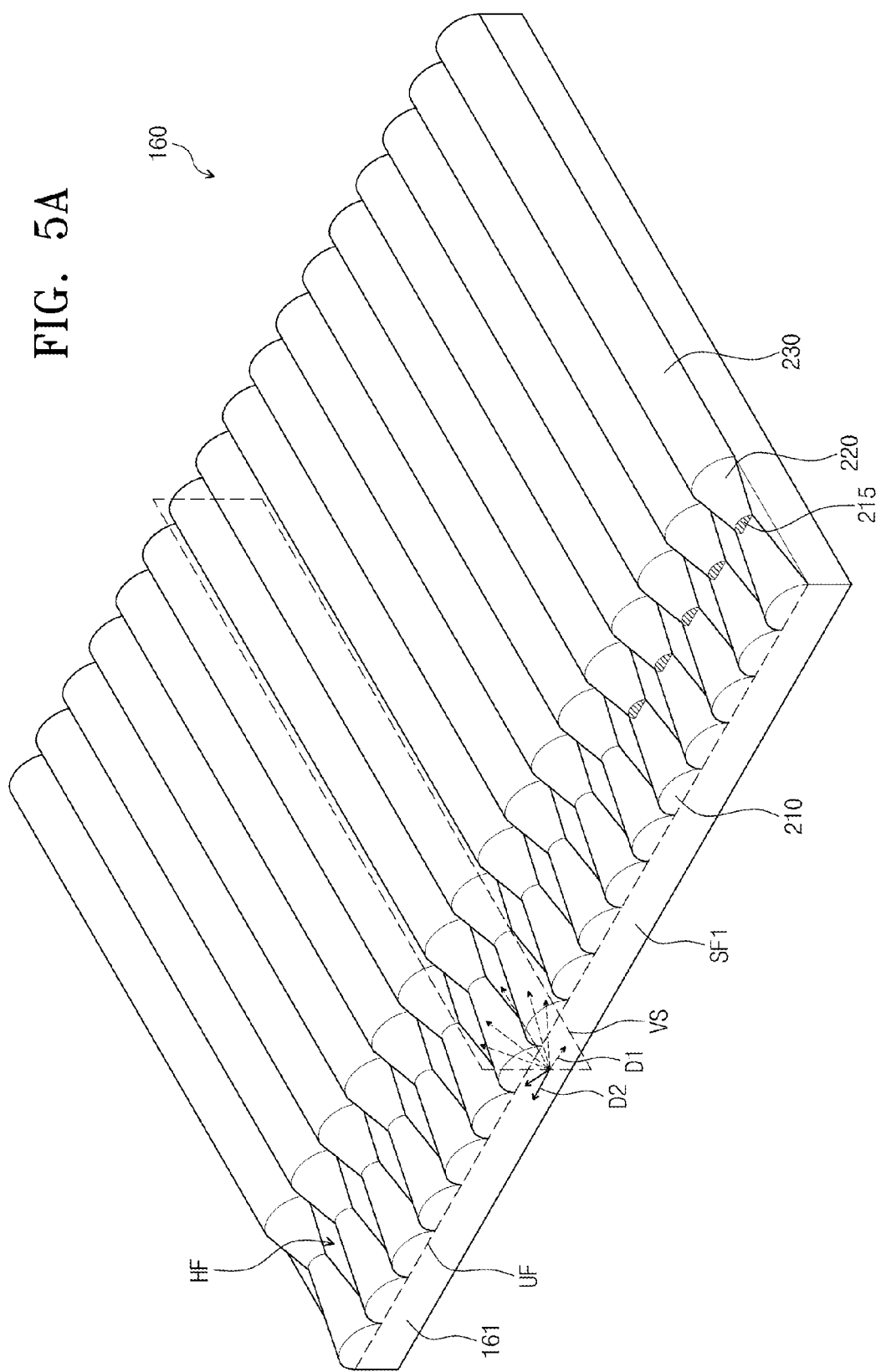
FIG. 5A is a perspective view showing a light guide plate shown in FIG. 1.
Figure 5B:
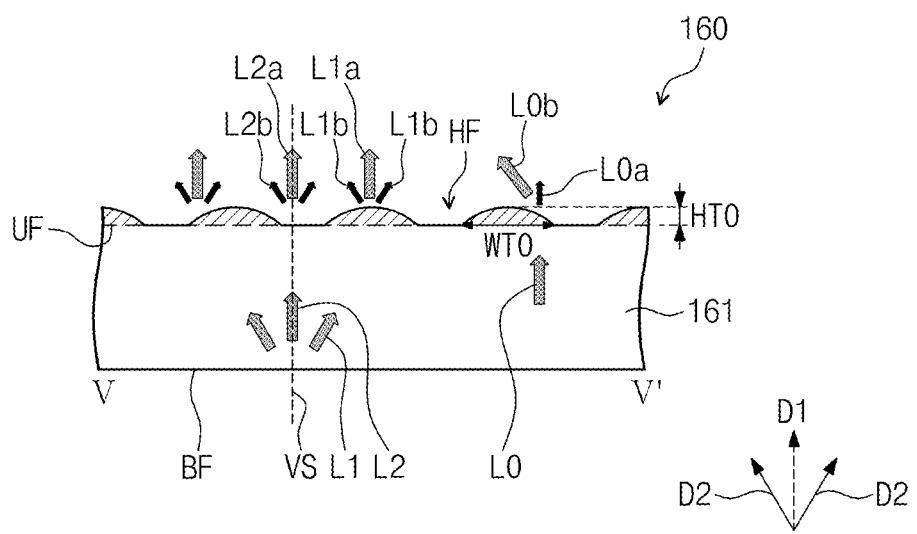
FIG. 5B is a cross-sectional view taken along a line V-V' shown in FIG. 2.

FIG. 5A is a perspective view showing the light guide plate 160 shown in FIG. 1 and FIG. 5B is a cross-sectional view taken along a line V-V' shown in FIG. 2. In FIGS. 5A and 5B, the same reference numerals denote the same elements in FIGS. 2 and 3, and thus detailed descriptions of the same elements will be omitted.

Referring to FIGS. 5A and 5B, a vertical surface VS substantially vertical to each of the upper surface UF and the first side surface SF1 of the body 161 of the light guide plate 160 is defined. The vertical surface VS is a virtual surface and may be all surfaces substantially vertical to the upper surface UF and the first side surface SF1.

As shown in FIG. 5A, each of directions defined on the vertical surface VS is referred to as a third direction D1. That is, the third direction D1 represents all directions defined on the vertical surface VS rather than only one direction. In addition, a fourth direction D2 means all directions not parallel to the vertical surface VS. To distinguish the third and fourth directions D1 and D2, the third direction D1 is indicated by a dotted line and the fourth direction D2 is indicated by a solid line.

FIG. 5B shows the cross-sectional view taken along a direction substantially parallel to the first side surface SF1 to show the portion in which the first protruding portion 210 is coupled with the second protruding portion 220. For the sake of clarity and ease of understanding, hereinafter, a surface where the first protruding portion 210 meets the second protruding portion 220 will be referred to as a protruding surface 215.

The protruding surface 215 has a height HT0 equal to the minimum value of each of the first and second heights HT1 and HT2 (refer to FIG. 3) and a width WT0 equal to the minimum value of each of the first and second widths WT1 and WT2 (refer to FIG. 2).

In the present exemplary embodiment, the horizontal surface HF is disposed adjacent to the protruding surface 215. The horizontal surface HF may be a surface of the upper surface UF of the body 161, in which the protruding portions 200 (refer to FIG. 1) are not disposed.

Different from the present exemplary embodiment, when the horizontal surface HF does not exist, a hot spot occurs since a brightness of a second area AR2 (refer to FIG. 6) of the light guide plate 160, which corresponds to between two light sources adjacent to each other, is higher than a brightness of a first area AR1 (refer to FIG. 6) of the light guide plate 160, which corresponds to the light sources. The reason that the hot spot occurs is as follows. In the light L0 incident to the light incident surface LS (refer to FIG. 3) along the third direction D1 and exiting through the protruding portions 200 (refer to FIG. 1), an amount of the light L0b exiting along the fourth direction D2 is greater than an amount of the light L0a exiting along the third direction D1. In addition, in the light L1 incident to the light incident surface LS (refer to FIG. 3) along the fourth direction D2 and exiting through the protruding portions 200 (refer to FIG. 1), an amount of the light L1a exiting along the third direction D1 is greater than an amount of the light L1b exiting along the fourth direction D2. Accordingly, the amount of the light incident along the third direction D1 and exiting along the fourth direction D2 is relatively greater in the first area AR1 (refer to FIG. 6) of the light guide plate 160 and the amount of the light incident along the fourth direction D2 and exiting along the third direction D1 is relatively greater in the second area AR2 (refer to FIG. 6) of the light guide plate 160. Therefore, the lights are collected to the second area AR2 (refer to FIG. 6), and as a result, the hot spot occurs, in which the brightness measured at the second area AR2 (refer to FIG. 6) is brighter than the brightness measured at the first area AR1 (refer to FIG. 6).

However, according to the present exemplary embodiment, the horizontal surface HF is disposed between the protruding portions 200 (refer to FIG. 1). A light L2 of the lights incident along the third direction D1 is guided to the display panel 110 (refer to FIG. 1) after exiting through the horizontal surface HF. Among the light L2 exiting through the horizontal surface HF, an amount of the light L2a exiting along the third direction D1 is greater than an amount of the light L2b exiting along the second direction D2. Thus, the lights may be prevented from being collected to the second area AR2 (refer to FIG. 6) of the light guide plate 160, and thus the hot spot may be prevented from occurring.

Figure 6:
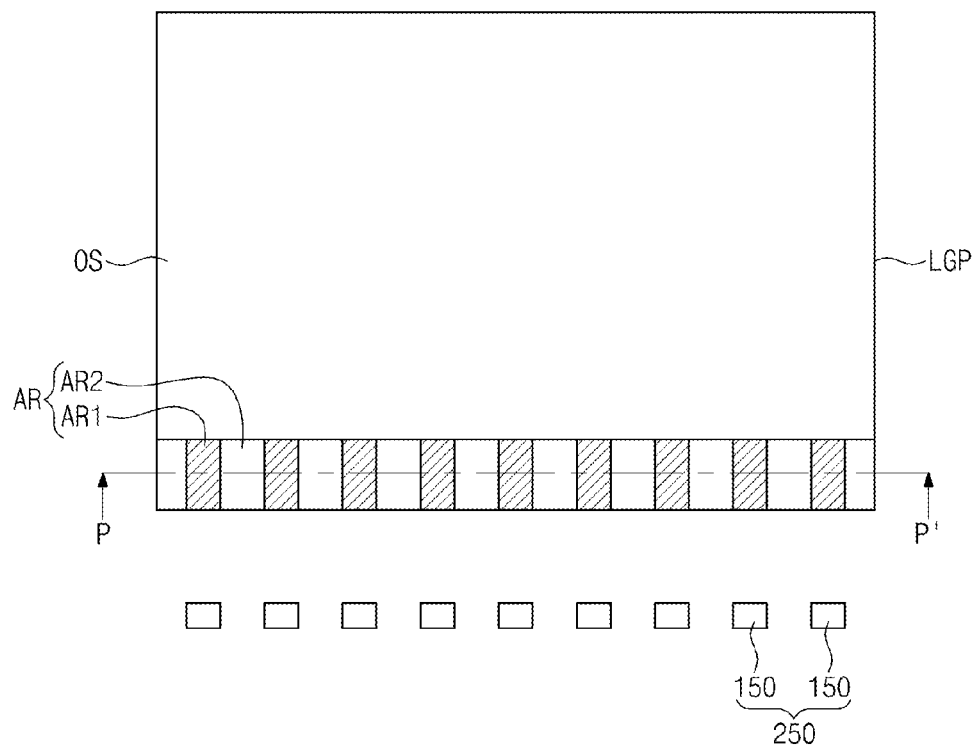
FIG. 6 is a plan view showing a light guide plate.
Figure 7:
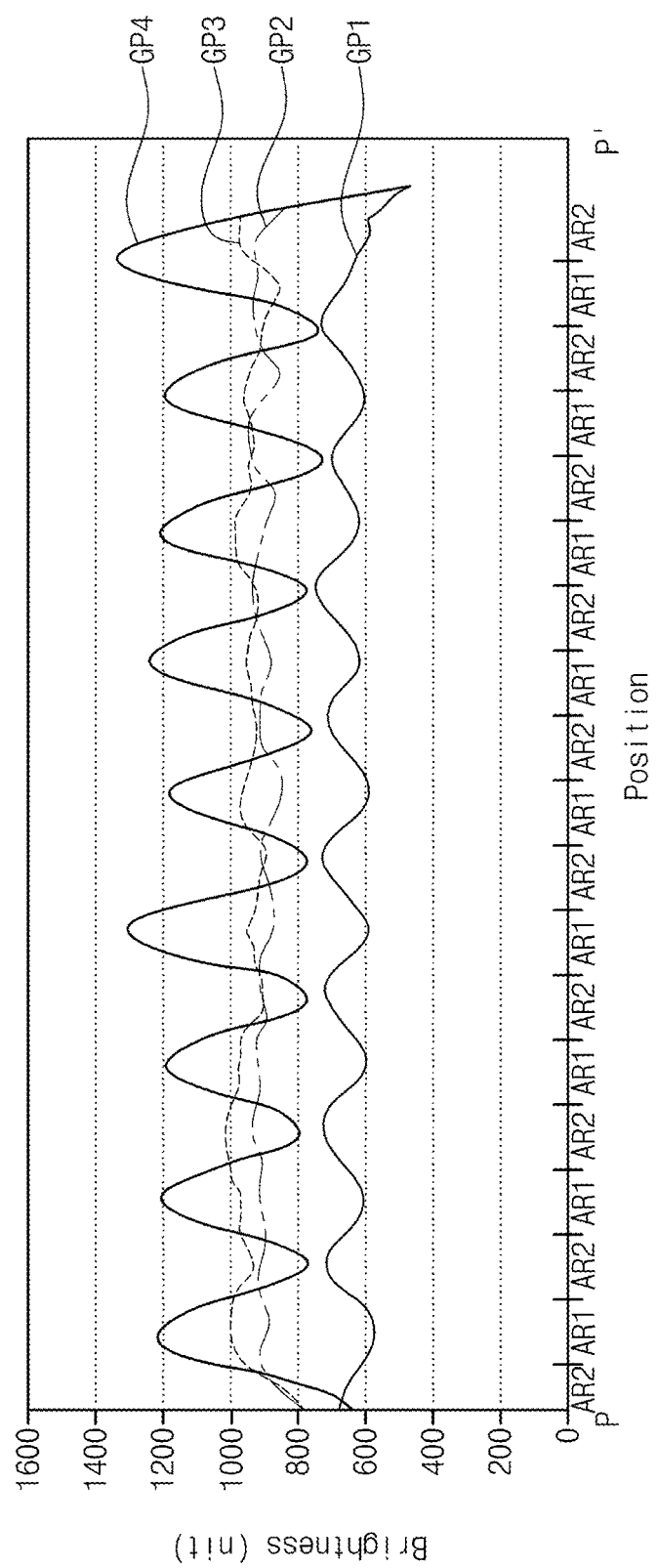
FIG. 7 is a graph showing a brightness at an imaginary line P-P' shown in FIG. 6 according to a height of a protruding surface shown in FIG. 5B.

FIG. 6 is a plan view showing the light guide plate LGP and FIG. 7 is a graph showing a brightness at a position of an imaginary line P-P' shown in FIG. 6 according to a height of the protruding surface 215 shown in FIG. 5B.

Referring to FIGS. 6 and 7, when an area of a light exit surface OS, which is disposed adjacent to light sources 250, is referred to as an adjacent light exit area AR, the adjacent light exit area AR is configured to include the first area AR1 and the second area AR2. The first area AR1 corresponds to the light source 150 and the second area AR2 corresponds to between the two light sources 150 adjacent to each other. The horizontal surface HF (refer to FIG. 5A) disposed on the second area AR2.

The first graph GP1 represents the brightness when the height HT0 (refer to FIG. 5B) of the protruding surface 215

(refer to FIG. 5B) corresponds to about 100% of the third height HT3 (refer to FIG. 4C), the second graph GP2 represents the brightness when the height HT0 (refer to FIG. 5B) of the protruding surface 215 (refer to FIG. 5B) corresponds to about 25% of the third height HT3 (refer to FIG. 4C), the third graph GP3 represents the brightness when the height HT0 (refer to FIG. 5B) of the protruding surface 215 (refer to FIG. 5B) corresponds to about 18% of the third height HT3 (refer to FIG. 4C), and the fourth graph GP4 represents the brightness when the height HT0 (refer to FIG. 5B) of the protruding surface 215 (refer to FIG. 5B) corresponds to about 0% of the third height HT3 (refer to FIG. 4C).

According to the first, second, third, and fourth graphs GP1, GP2, GP3, and GP4, the brightness measured at the position of the imaginary line P-P' is varied depending on the height HT0 (refer to FIG. 5B) of the protruding surface 215 (refer to FIG. 5B).

Referring to the first graph GP1, the horizontal surface HF (refer to FIG. 5B) does not exist at the position of the imaginary line P-P' since the height HT0 (refer to FIG. 5B) of the protruding surface 215 (refer to FIG. 5B) is substantially equal to the third height HT3 (refer to FIG. 4C). Accordingly, the brightness measured at the second area AR2 is higher than the brightness measured at the first area AR1. For instance, the brightness measured at the first area AR1 is about 600 nit and the brightness measured at the second area AR2 is about 750 nit. Therefore, the hot spot phenomenon, in which the brightness of the second area AR2 corresponding to between the light sources 150 is brighter about 150 nit than the brightness of the first area AR1, occurs.

Referring to the fourth graph GP4, when the height HT0 (refer to FIG. 5B) of the protruding surface 215 (refer to FIG. 5B) corresponds to about 0% of the third height HT3, the light exit surface OS corresponding to the position of the imaginary line P-P' may be horizontal without any protruding portions. The light emitted from the light source 150 is incident to the light guide plate LGP and exits through the first and second areas AR1 and AR2 in which the protruding portions 200 (refer to FIG. 1) do not exist. When the protruding portions 200 do not exist in the first and second areas AR1 and AR2, the light exits along the direction substantially the same as the direction in which the light is incident. Therefore, the light is collected to the first area AR1 corresponding to the light source 150. For instance, the brightness of the first area AR1 is about 1300 nit and the brightness of the second area AR2 is about 800 nit. As a result, the hot spot phenomenon, in which the brightness of the first area AR1 corresponding to the light source 150 is brighter about 500 nit than the brightness of the second area AR2, occurs.

Referring to the second graph GP2, when the height HT0 (refer to FIG. 5B) of the protruding surface 215 (refer to FIG. 5B) corresponds to about 25% of the third height HT3 (refer to FIG. 4C), the light L2 (refer to FIG. 5A), which corresponds to the portion of the light incident along the third direction D1 (refer to FIG. 5A) substantially parallel to the vertical surface VS (refer to FIG. 5A), exits through the horizontal surface HF (refer to FIG. 5A) and the other light L0 (refer to FIG. 5B) exits through the protruding portions 200 (refer to FIG. 1).

In the light L2 (refer to FIG. 5B) exiting through the horizontal surface HF (refer to FIG. 5B), the amount of the light L2$a$ exiting along the third direction D1 (refer to FIG. 5B) is greater than the amount of the light L2$b$ exiting along the fourth direction D2 (refer to FIG. 5B). Thus, the light is not collected to the second area AR2 corresponding to between the light sources 150. In addition, in the light L0 (refer to FIG. 5B) exiting through the protruding portions 200 (refer to FIG. 1) among the light incident along the third direction D1 (refer to FIG. 5B), the amount of the light L0$b$ exiting along the fourth direction D2 (refer to FIG. 5A) is greater than the amount of the light L0$a$ exiting along the third direction D1 (refer to FIG. 5B). Accordingly, the light is not collected to the first area AR1 corresponding to the light source 150.

Therefore, a difference in brightness between the first area AR1 and the second area AR2 is reduced and the hot spot phenomenon is reduced. As a result, the backlight unit 120 (refer to FIG. 1) provides the light with uniform brightness to the display panel 110 (refer to FIG. 1), and thus the display quality of the display apparatus 100 is improved.

Referring to the third graph GP3, when the height HT0 (refer to FIG. 5B) of the protruding surface 215 (refer to FIG. 5B) corresponds to about 18% of the third height HT3 (refer to FIG. 4C), the difference between the brightness measured at the first area AR1 corresponding to the light source 150 and the brightness measured at the second area AR2 corresponding to between the light sources 150 is reduced and the hot spot phenomenon is reduced. As a result, the backlight unit 120 (refer to FIG. 1) provides the light with uniform brightness to the display panel 110 (refer to FIG. 1), and thus the display quality of the display apparatus 100 is improved.

As the height HT0 (refer to FIG. 5B) of the protruding surface 215 (refer to FIG. 5A) becomes closer to the third height HT3 (refer to FIG. 4C), the brightness measured at the second area AR2 becomes relatively higher than the brightness measured at the first area AR1, and as the height HT0 (refer to FIG. 5B) of the protruding surface 215 (refer to FIG. 5A) becomes closer to zero (0), the brightness measured at the first area AR1 becomes relatively higher than the brightness measured at the second area AR2. Therefore, the height HT0 (refer to FIG. 5B) of the protruding surface 215 (refer to FIG. 5A) is set to allow the difference between the brightness measured at the first area AR1 and the brightness measured at the second area AR2 to be minimized. For instance, the height HT0 (refer to FIG. 5B) of the protruding surface 215 (refer to FIG. 5A) may correspond to about 15% to about 28% of the height HT3 (refer to FIG. 4C), and preferably about 18% to about 25%.

Although the exemplary embodiments of the present inventive concept have been described, it is understood that the present inventive concept should not be limited to these exemplary embodiments but various changes and modifications can be made by one ordinary skilled in the art within the spirit and scope of the present inventive concept as hereinafter claimed.

What is claimed is:

1. A display apparatus comprising:
   a display panel receiving light and displaying an image;
   a light source emitting the light; and
   a light guide plate receiving the light and guiding the light to the display panel, the light guide plate comprising:
   a body comprising a first side surface disposed adjacent to the light source, a second side surface facing the first side surface, and an upper surface; and
   protruding portions protruded from the upper surface,
   wherein each of the protruding portions comprises first and second protruding portions sequentially arranged from the first side surface to the second side surface, a width of the first protruding portion in a direction substantially parallel to the first side surface becomes smaller as a distance from the first side surface becomes larger, and a width of the second protruding portion in the direction substantially parallel to the first side surface becomes larger as the distance from the first side surface becomes larger, and wherein the first protruding portion has a side surface which is in a same plane as the first side surface of the body and the width of the first protruding portion at the side surface has a maximum value.

2. The display apparatus of claim 1, wherein a minimum value of the first width is substantially equal to a minimum value of the second width.

3. The display apparatus of claim 1, wherein each of the protruding portions further comprises a third protruding portion having a predetermined length and facing the first protruding portion such that the second protruding portion is disposed between the first and third protruding portions, and a width of the third protruding portion in the direction substantially parallel to the first side surface is constant.

4. The display apparatus of claim 3, wherein a maximum value of the second width is substantially equal to the third width.

5. The display apparatus of claim 3, wherein an outer portion of a cross-sectional surface, which is substantially parallel to the first side surface, of each of the first, second, and third protruding portions has a round shape.

6. The display apparatus of claim 5, wherein a first radius curvature of a first cross-sectional surface of the first protruding portion, which is substantially parallel to the first side surface, a second radius curvature of a second cross-sectional surface of the second protruding portion, which is substantially parallel to the first side surface, and a third radius curvature of a third cross-sectional surface of the third protruding portion, which is substantially parallel to the first side surface, are substantially equal to each other.

7. The display apparatus of claim 3, wherein the first protruding portion has a first height becoming smaller as the distance from the first side surface becomes larger, the second protruding portion has a second height becoming larger as the distance from the first side surface becomes larger, and the third protruding portion has a third height that is constant.

8. The display apparatus of claim 7, wherein a maximum value of the first height is substantially equal to the third height.

9. The display apparatus of claim 7, wherein a maximum value of the second height is substantially equal to the third height.

10. The display apparatus of claim 7, wherein a minimum value of the first height is substantially equal to a minimum value of the second height.

11. The display apparatus of claim 7, wherein a minimum value of each of the first and second heights corresponds to about 15% to about 28% of the third height.

12. The display apparatus of claim 3, wherein the first protruding portion is connected to the second protruding portion, the second protruding portion is connected to the third protruding portion, and each of the protruding portions extends from the first side surface to the second side surface to have a predetermined length.

13. The display apparatus of claim 3, wherein the light guide plate comprises a light incident surface to which the light emitted from the light source is incident, and the light incident surface is defined by the first side surface and one surface of the first protruding portion.

14. The display apparatus of claim 1, wherein the upper surface connects top portions of the first side surface and the second side surface and faces the display panel.

15. A backlight unit comprising:
a light source emitting light; and
a light guide plate receiving the light and guiding the light, the light guide plate comprising:
a body comprising a first side surface disposed adjacent to the light source, a second side surface facing the first side surface, and an upper surface; and
protruding portions protruded from the upper surface, wherein each of the protruding portions comprises first and second protruding portions sequentially arranged from the first side surface to the second side surface, a width of the first protruding portion in a direction substantially parallel to the first side surface becomes smaller as a distance from the first side surface becomes larger, and a width of the second protruding portion in the direction substantially parallel to the first side surface becomes larger as the distance from the first side surface becomes larger,
wherein the first protruding portion has a side surface which is in a same plane as the first side surface of the body and the width of the first protruding portion at the side surface has a maximum value.

16. The backlight unit of claim 15, wherein each of the protruding portions further comprises a third protruding portion having a predetermined length and facing the first protruding portion such that the second protruding portion is disposed between the first and third protruding portions, and a width of the third protruding portion in the direction substantially parallel to the first side surface is constant.

17. The backlight unit of claim 16, wherein the first protruding portion has a first height becoming smaller as the distance from the first side surface becomes larger, the second protruding portion has a second height becoming larger as the distance from the first side surface becomes larger, and the third protruding portion has a third height that is constant.

18. The backlight unit of claim 17, wherein a minimum value of each of the first and second heights corresponds to about 15% to about 28% of the third height.

19. The backlight unit of claim 15, wherein the protruding portions comprise a same material as the body.

20. A display apparatus comprising:
a display panel receiving light and displaying an image;
a light source emitting the light; and
a light guide plate receiving the light and guiding the light to the display panel, the light guide plate comprising:
a body comprising a first side surface disposed adjacent to the light source, a second side surface facing the first side surface, and an upper surface; and
protruding portions protruded from the upper surface, wherein each of the protruding portions comprises first, second, and third protruding portions sequentially arranged from the first side surface to the second side surface, a width of the first protruding portion in a direction substantially parallel to the first side surface becomes smaller as a distance from the first side surface becomes larger, a width of the second protruding portion in the direction substantially parallel to the first side surface becomes larger as the distance from the first side surface becomes larger, and a width of the third protruding portion in the direction substantially parallel to the first side surface is constant, and wherein the third protruding portions extend from the second protruding portion to the second side surface to have a predetermined length.

\* \* \* \* \*